(12) United States Patent
Sitaram et al.

(10) Patent No.: US 9,266,783 B2
(45) Date of Patent: Feb. 23, 2016

(54) PROCESS FOR THE PREPARATION OF GEOPOLYMERIC FUNCTIONAL MATERIALS IN A SOLID FORM

(71) Applicant: Council of Scientific & Industrial Research, New Delhi (IN)

(72) Inventors: Amritphale Sudhir Sitaram, Bhopal (IN); Mudgal Manish, Bhopal (IN); Chouhan Ramesh Kumar, Bhopal (IN); Mishra Deepti, Bhopal (IN); Chandra Navin, Bhopal (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/599,877

(22) Filed: Jan. 19, 2015

(65) Prior Publication Data

US 2015/0203405 A1   Jul. 23, 2015

(30) Foreign Application Priority Data

Jan. 20, 2014   (IN) .......................... 0156/DEL/2014

(51) Int. Cl.
*C04B 18/08* (2006.01)
*C04B 18/24* (2006.01)
*C04B 40/00* (2006.01)
*C04B 28/00* (2006.01)

(52) U.S. Cl.
CPC ........... *C04B 40/0042* (2013.01); *C04B 28/006* (2013.01)

(58) Field of Classification Search
CPC ........ C04B 12/04; C04B 18/08; C04B 18/24; C04B 22/063; C04B 28/006; C04B 40/0042
USPC ........................................................ 106/708
See application file for complete search history.

(56) References Cited

U.S. PATENT DOCUMENTS

| | | | |
|---|---|---|---|
| 4,328,035 A * | 5/1982 | Ingles et al. .................. | 106/624 |
| 2011/0271876 A1 * | 11/2011 | Alter et al. .................... | 106/707 |
| 2014/0026787 A1 * | 1/2014 | Amritphale et al. ......... | 106/697 |
| 2014/0342156 A1 * | 11/2014 | Seo et al. ...................... | 428/402 |

OTHER PUBLICATIONS

Derwent-Acc-No. 2014-S36801, abstract of Chinese Patent Specification No. CN 103922683A (Jul. 2014).*
Derwent-Acc-No. 2014-W67610, abstract of Chinese Patent Specification No. CN 104072002 (Oct. 2014).*

* cited by examiner

*Primary Examiner* — Anthony J Green
(74) *Attorney, Agent, or Firm* — Knobbe Martens Olson & Bear LLP

(57) ABSTRACT

The present invention provides a process for the preparation of tailored precursor materials in a solid powder form, useful for geopolymeric system containing pentavalent silicon complexes in a solid powder form. The raw materials used are fly ash, sodium hydroxide, and rice husk with and without sodium silicate. The tailored precursors so obtained in solid powder need only water at site, instead of highly alkaline solution for obtaining the cementitious geopolymeric materials.

8 Claims, No Drawings

PROCESS FOR THE PREPARATION OF GEOPOLYMERIC FUNCTIONAL MATERIALS IN A SOLID FORM

CROSS-REFERENCE TO RELATED APPLICATIONS

This application claims the benefit of priority to Indian Patent Application No. 0156/DEL/2014, filed on Jan. 20, 2014, the disclosure of which is hereby expressly incorporated by reference in its entirety.

FIELD OF INVENTION

The present invention relates to a tailored precursor material composition in a solid powder form, useful for geopolymeric system and preparation thereof.

BACKGROUND

In the conventional geopolymeric system, geopolymeric conventional materials are prepared by dissolution and polycondensation reaction between the (a) untailored solid reactive powders of alumino-silicate materials and (b) essentially are highly alkaline aqueous solution.

Reference may be made to the article "Sustainable design of geopolymers—Integration of economic and environmental aspects in the early stage of material development authored by M. Weil, E. Gasafi, A. Buchwald and K. Dombrowski, 11$^{th}$ Annual International Sustainable Development Research Conference, Helsilnki, Finnland, 2005; pp 1-14, wherein it is reported that the conventional process of making geopolymeric materials, essentially consist of a silicate aluminate solid component as binding material and an alkaline solution component as alkaline activator. However, the drawbacks of this process are the use of alkali activators in solution form as one of the essential component which results in difficulty in handling the solution.

Reference may be made to article "Acid resistance of fly ash based geopolymer mortars, authored by Suresh Thokchom, Partha Ghosh, and Somnath Ghosh, International Journal of Recent trends in Engineering, 1(6) 2009, pp 36-40, wherein it is reported that mixture of sodium hydroxide and sodium silicate solution were used to activate fly ash for producing geopolymer binder. However, the drawbacks of this process are the use of alkali activators in solution form as one of the essential component which results in difficulty in handling the solution.

Reference may be made to the article "Alkali activated Geopolymers: A Literature Review" authored by Jeffrey C. Petermann and Athar Saeed and Michael I. Hammons; Air Force Research Laboratory Materials and Manufacturing Directorate, July 2010, contract No. FA4819-07-D0001 pp: 1-99, wherein it is reported that in the conventional process of making geopolymeric materials, essentially fly ash or other pozzolona are mixed with the alkaline solutions. However, the drawbacks associated with the process are use of alkali activators in solution form as one of the essential component which results in difficulty in handling the solution. Another drawback associated with the process is use of untailored raw materials resulting in development of products with unpredictable properties.

Reference may be made to article 'Mechanical and microstructural properties of alkali-activated fly ash geopolymers, Journal of Hazardous Materials, 181(1-3), 2010 pp 35-42 wherein aqueous solutions of $Ca(OH)_2$, NaOH, $NaOH+Na_2CO_3$, KOH and sodium silicate (water glass) of various concentrations were used as alkali activators. It was established that the nature and concentration of the activator was the most dominant parameter in the alkali-activation process. However, the drawbacks associated with the process is use of alkali activators in solution form as one of the essential component which results in difficulty in handling the solution and also the use of untailored raw materials resulting in development of products with unpredictable properties.

Reference may be made to article 'Fly Ash-Based Geopolymer Mortar Incorporating Bottom Ash, authored by Djwantoro Hardjito, and Shaw Shen Fung, Modern Applied Science, 4 (1), 2010, 44-52, wherein mixture of Potassium Silicate ($K_2SiO_3$) solution and Potassium Hydroxide (KOH) solution were used as the alkaline activator. The mixture of fly ash and aggregates was mixed mechanically and Potassium Silicate ($K_2SiO_3$) solution and Potassium Hydroxide (KOH) solution were premixed separately. However, the drawbacks associated with the process is use of alkali activators in solution form which results in difficulty in handling the solution and also the use of untailored raw materials resulting in development of products with unpredictable properties. Reference may be made to article "Preliminary study on effect of NaOH concentration on early age compressive strength of kaolin-based green cement" authored by H. Kamarudin, A. M. Mustafa Al Bakri, M. Binhussain, C. M Ruzaidi, M. Luqman, C. Y. Heah, Y. M. Liew, 2011 International Conference on Chemistry and Chemical Process IPCBEE, 10, 2011, pp 18-24 wherein sodium hydroxide was mixed with distilled water to prepare solutions of concentrations 6-14M, cooled to room temperature and mixed with sodium silicate to prepare liquid alkali activator 24 hours before use. However, the drawbacks of the process is use of alkali activators solution which results in difficulty in handling the solution.

Reference may be made to article "Review on fly ash-based geopolymer concrete without Portland Cement" Journal of Engineering and Technology Research authored by Mohd Mustafa Al Bakri, H. Mohammed, H. Kamarudin, I. Khairul Niza and Y. Zarina, 3(1), pp. 1-4, January 2011 wherein it is reported that sodium silicate and potassium hydroxide were used as alkali activators and usually either of this material was mixed with sodium hydroxide to produce the alkaline solution of molarity (M) 7 to 10 M and was prepared a day before it is to be mixed with fly ash and aggregates to prepare concrete. However, the drawbacks of the process is use of alkali activators solution which results in difficulty in handling the solution and also the use of untailored raw materials resulting in development of products with unpredictable properties.

Reference may be made to article "Investigating shrinkage changes of natural pozzolan based geopolymer cement paste" authored by E. Najafi Kani and A. Allahverdi, Iranian Journal of Materials Science and Engineering 8 (3) 2011, pp 50-60 wherein it is reported that sodium hydroxide was added to sodium silicate solution in appropriate quantity to adjust the dosage of activator to prepare geopolymer mixes. However, the drawbacks of the process are again the use of alkaline activator solution which results in difficulty in handling the solution.

Reference may be made to the article "The processing, characterization, and properties of fly ash based geopolymer concrete, M. Mustafa Al Bakri, H. Kamarudin, M. Bnhussain, I. Khairul Nizar, A. R. Rafiza and Y. Zarina, Rev. Adv. Mater. Sci. 30 (2012) 90-97 wherein it is reported that the two major constituents of geopolymer source material consist of alumina-silicate and alkaline liquids. Most commonly used alkaline activators are a mixture of sodium or potassium hydroxide (NaOH, KOH) and sodium silicate or potassium silicate and mixing of the activators 24 hours prior to use was also recommended in the article. However, the drawbacks of the process are use of alkali activators solution which results in difficulty in handling the solution and also the use of untailored raw materials resulting in development of products with unpredictable properties.

Reference may be made to the patent PCT/AU2012/001193 wherein reported is the use of silicate solution and alkali hydroxide for preparation of geopolymer mix. However, the drawbacks of the process is use of alkali activators solution which results in difficulty in handling the solution and also the use of untailored raw materials resulting in development of products with unpredictable properties.

Reference may be made to the article 'Reactivity, workability and strength of potassium versus sodium-activated high volume fly ash-based geopolymers authored by D. Sabitha, J. K. Dattatreya, N. Sakthivel, M. Bhuvaneshwari and S. A. Jaffer Sathik, Current Science, 103(11), 2012, pp 1320-1327 wherein commercial-grade sodium hydroxide and potassium hydroxide flakes were dissolved in distilled water to obtain the respective alkali solutions one day prior to geopolymer cement preparation to avoid excessive heat resulting from the exothermic reaction. Sodium Silicate and potassium silicate solutions were used as the alkaline activators. However, the drawbacks of the process is use of alkali activators solution which results in difficulty in handling the solution and also the use of untailored raw materials resulting in development of products with unpredictable properties.

Reference may be made to the article 'Geopolymer Concrete' Concrete Pavement, CPTP Technology Programme, website, wherein it is reported that user friendly geopolymers which can be used under conditions similar to Portland cement are the current focus of extensive worldwise research. However, the drawbacks associated with production of geopolymer are safety risk associated with the high alkalinity of the activating solution. These facts may limit the practical use of geopolymer concrete.

Reference may be made to the article—Mechanical Properties and Microstructure of Class C Fly Ash-Based Geopolymer Paste and Mortar authored by Xueying Li, Xinwei Ma, Shoujie Zhang and Enzu Zheng' Materials 2013, 6(4), 1485-1495 wherein class C Fly ash was used to carry out experiments and alkali activator were sodium silicate and sodium hydroxide solution. However, the drawbacks of the process are again use of alkaline activator solution and also safety risk associated with the high alkalinity of the activating solution. The use of untailored fly ash is another drawback of the process which resulting in development of product with unpredictable properties.

Reference may be made to the patent WO 2008113609 A2, wherein the geopolymer coating is two component and before use the liquid component (alkaline agent) and solid component (aluminosilicate material) must be mixed with each other. However, the drawbacks of the process is use of raw materials in two part system for preparation of geopolymer coating i.e alkaline agent in liquid form as one part and solid aluminosilicate material as second part which causes difficulty in practical application. The drawbacks of the conventional processes mentioned in the above articles are: the use of high concentration of alkali activators in solution form with pH in the range of 12-14 ii) generation of heat when water is mixed with alkali activators for preparation of solution. This results in difficulty in handling the solution by unskilled workers while working with geopolymer systems.

From the above mentioned prior art and based on the drawbacks of the conventional process, the various issues to be addressed and problems to be solved are as follows:

The last two decades have witnessed significant achievements in the area of making advanced multifunctional materials and one of them is the development of inorganic geopolymeric materials. However, the development of this unique technology suffers from following drawbacks:

a) Firstly, the work so far carried out in the area of development of geopolymeric materials is basically restricted and is essentially based on the need of two parts system wherein i) highly alkaline solutions act as one part ii) and untailored raw materials act as second part, thereby prohibiting the techno-commercial viability of the conventional geopolymeric materials.

b) Secondly, the use of untailored solid reactive powders of alumino-silicate materials in the conventional geopolymeric process result is non-uniform end products.

c) Since in the conventional geopolymeric system, it is essential to mix both the parts i.e. part one and part two materials in appropriate proportions, there is high risk involved in handling of their highly alkaline solutions.

d) The Application Spectrum of conventional geopolymeric materials is narrow as they have relatively limited resistance to heat, acidic environment and durability aspects. Thus in order to overcome the above raised drawbacks awaited with the prior art, the inventors of the present invention realized that there is new process to provide a versatile geopolymer cement that can be mixed with only water and can be hardened like cement, which is the game changing advancement that will revolutionize the use of geopolymer cementitious materials in construction and infrastructure.

SUMMARY OF THE INVENTION

Accordingly, the present invention provides a tailored precursor material composition in a solid powder form, useful for geopolymeric system and preparation thereof that enables a tailoring of raw materials and sequencing of reactions among them for preparation of geopolymeric materials which can be easily used on site the developed material have improved resistance to heat and corrosion aspects.

In an embodiment the present invention, provides a tailored precursor material composition in solid form for geoploymer material comprising fly ash (59-91%), sodium hydroxide (11-15%), rice husk (0.8-11%) and optionally sodium silicate (0-29%).

In another preferred embodiment of the present invention, provides a process for the preparation of tailored precursor material composition in a solid powder form for geopolymeric material wherein the process comprising the steps of:

i. grinding of raw materials fly ash (59-91%), sodium hydroxide (11-15%), rice husk (0.8-11%) and optionally sodium silicate (0-29%) to get a powder having particle size in the range of 45 to 60 micron to get tailored precursor material;

ii. adding water to the precursor material of step (i) followed by casting the material in a desired shape and size, curing the geopolymeric material.

In still another embodiment of the present invention, provides the raw materials are dry grinded together using ball mill or advanced machinery such as planetary mill, for a period ranging from 1-72 hours.

In yet another embodiment of the present invention, wherein, the ratio of precursor material and water is 4 to 7.

In an another embodiment of the present invention, wherein, the curing of geopolymeric material is done using microwave oven for a duration of 10 seconds to 60 minutes with a power range of 5 to 1200 watt.

In still another embodiment of the present invention, wherein, the curing of geopolymeric material is done using hot air oven at a temperature ranging between 60-90° C. for a period of time 24 hr-7 days.

In yet another embodiment of the present invention, wherein geopolymeric material is useful for further broadening the application spectrum of the conventional geopolymeric system such as various application ranging from cement, mortar, on site in-situ concrete to geopolymer coating applications.

In another preferred embodiment of the present invention, wherein together grinding of raw materials fly ash, sodium hydroxide, rice husk, with and without sodium silicate in appropriate proportions.

In still another embodiment of the present invention, wherein cured geopolymer samples were evaluated for physico-chemical-mechanical and cementitious characteristics such as compressive strength, flexural strength, density, water absorption as per standard test methods.

In yet another embodiment of the present invention provides a Geopolymeric material prepared by the process, wherein the material is having pentavalent silicon complexes and posses compressive strength ranging between 2-50 MPa.

Aspects of the present invention concern the provision of "a tailored precursor material composition in a solid powder form, useful for geopolymeric system and preparation thereof which is useful for further broadening the application spectrum of the conventional geopolymeric system." which obviates the drawbacks of the hitherto known prior art as detailed above.

Other features concern the provision of geopolymeric materials based on inorganic precursors from industrial wastes and also from pure compounds.

Still features of the present invention concern the provision of a "One part" system i.e. all the raw materials namely Fly ash or any silicon and aluminum and alkali containing materials only in solid form as one part.

Yet another embodiment of the present invention is to provide, a novel process for making cement free "tailored precursor materials" in a solid powder form, by "designing of conditions" for synergistic and simultaneous mechano-chemical reactions among all the selected raw materials and additives essentially fly ash, sodium hydroxide and sodium silicate in powder form.

Yet another embodiment of the present invention is to provide, the solid powder of "tailored precursor materials" which, needs "only water" at site, instead of use of highly alkaline solution for obtaining the tailored cementitious geopolymeric materials.

Yet another embodiment of the present invention is to provide, User and environment friendly, novel process as it obviates the use and need of handling of highly alkaline solutions.

DETAILED DESCRIPTION OF THE INVENTION

The main object of the present invention is to provide a tailored precursor material composition in a solid powder form, useful for geopolymeric system and preparation thereof containing pentavalent silicon complexes, useful for further broadening the application spectrum of the conventional geopolymeric system, which comprises together grinding of raw materials fly ash, sodium hydroxide, rice husk, advanced machinery such as planetary mill, for a period ranging from 1-72 hours. The dry mix so obtained was used immediately or was stored in a polyethylene bag for period upto thirty days and was then reacted with water alone for making geopolymeric materials for various application ranging from cement, mortar, on site in-situ concrete to geopolymer coating applications. The developed material was cured in hot air oven in the temperature range of ambient and upto 90° C. and the curing duration varied from 1 to 28 days. In the case of microwave curing of developed material, the duration of exposure of microwave is in the range of 10 seconds to 60 minutes with a power range of 5 to 1200 watt. The cured geopolymeric samples were evaluated for physico-chemical-mechanical and cementitious characteristics and for coating applications. All the samples were prepared and tested using standard practices.

In an embodiment of the present invention, the raw material includes fly ash, sodium hydroxide, rice husk and with and without sodium silicate, in appropriate proportions.

In another embodiment of the present invention, the together grinding of the raw materials mix is carried out using conventional as well as by advanced machinery in dry conditions for a period ranging from 1-72 hours.

In another embodiment of the present invention, the dry mix obtained was used immediately or was stored in a polyethylene bag for period upto thirty days and was then reacted with water alone for making geopolymeric materials for various application ranging from cement, mortar, on site in-situ concrete to geopolymer coating applications In still another embodiment of the present invention, the geopolymeric material were cured in an air oven in the temperature range of ambient upto 90° C. and the curing duration varied from 1 to 28 days.

In still another embodiment of the present invention, the geopolymeric material were cured in a hot air oven in the temperature range of 60 to 90° C. and the curing duration varied from 24 hours to 7 days.

In still another embodiment of the present invention developed geopolymeric material were cured in microwave oven for a duration of 10 seconds to 60 minutes with a power range of 5 to 1200 watt In still another embodiment of the present invention the cured geopolymer samples were evaluated for physico-chemical-mechanical and cementitious characteristics and for coating applications.

In still another embodiment of the present invention the geopolymer material were prepared and tested using standard practices.

In yet another embodiment of the present invention provides a Geopolymeric material prepared by the process, wherein the material is having pentavalent silicon complexes and possess compressive strength ranging between 2-50 MPa.

In the conventional geopolymeric system, geopolymeric cementitious materials are prepared by dissolution and polycondensation reactions between the a) untailored Fly ash and b) essentially an "aqueous highly alkaline solution". The need of two parts system in the conventional geopolymeric cementitious materials i.e. an "aqueous highly alkaline solution" as one part and the untailored fly ash as second part, prohibits the techno-commercial viability of geopolymeric materials, similar to conventional cement system and also the use of untailored fly ash prohibits in getting tailored raw materials leading to products with unpredictable properties.

The novel process of the present invention obviates the drawbacks of a) use of "highly alkaline solution" as a one part as a necessary reactant solution and b) use of untailored fly ash as second part in the conventional geopolymeric process.

The novelty of the process of the present invention essentially involves making cement free "tailored precursor materials" in a solid powder form containing pentavalent silicon complexes by "designing of conditions" for synergistic and simultaneous mechano-chemical reactions among the selected raw materials by together dry grinding and appropriate sequencing of reaction among the all the raw materials fly ash, sodium hydroxide, rice husk and with and without sodium silicate by controlling and designing the intermittent dry grinding conditions. The tailored solid powder so obtained needs "only water" at site, instead of use of highly alkaline solution for obtaining the tailored cementitious geopolymeric materials and thus it is useful for further broadening the application spectrum of the conventional geopolymeric system.

The present invention provides a process that enables a tailoring of raw materials and sequencing of reactions among them for preparation of geopolymeric materials which can be easily used on site. The developed material has improved resistance to heat and corrosion aspects.

The process essentially involves preparation of precursors for making geopolymeric materials in one part system in solid form only in which there is no need of using the highly alkaline activator solution to obtain the final product i.e. the geopolymeric material. The prepared tailored materials need "only water" at site due to designing of conditions for synergistic and simultaneous mechano-chemical reactions among the selected raw materials in solid form itself and thus, the process is useful for broadening the techno-commercial viability of geopolymeric cementitious materials in an manner similar to widely used "conventional cementitious materials".

In an embodiment, the present invention provides a process for the preparation of tailored precursor materials in a solid powder form, useful for geopolymeric system by "designing of conditions" which includes defining the process parameters namely a) sequencing of reactions among all the raw materials b) stoichiometric compositions of raw materials c) together grinding duration for appropriate applications. The tailored solid powder so obtained needs "only water" at site, instead of use of highly alkaline solution for obtaining the tailored cementitious geopolymeric materials.

In another embodiment, the present invention provides a process which obviates the need of two parts system as used in the conventional geopolymeric cementitious materials i.e. an "aqueous highly alkaline solution" as one part and the untailored fly ash as second part, which prohibits the techno-commercial viability of conventional geopolymeric materials.

In yet another embodiment, the present invention provides a process wherein the handling of highly alkaline solutions used in the conventional geopolymeric systems is avoided, thereby making the process simple and easy to use on site. The one part system enables in making the geopolymeric materials user and environment friendly, as it obviates the use and need of handling highly alkaline solutions.

In another embodiment, the present invention provides a process that enables in obtaining desired pentavalent silicon complexes in-situ in solid powder form by sequencing of reactions among all the raw materials by together grinding in appropriate compositions.

In an embodiment, the present invention provides a one part system i.e. all the raw materials namely Fly ash, sodium hydroxide, rice husk with and without sodium silicate only in solid form as one part containing pentavalent silicon complexes.

In another embodiment, the present invention provides a making cement free "tailored precursor materials" in a solid powder form, by "designing of conditions" for synergistic and simultaneous mechano-chemical reactions among all the selected raw materials fly ash, sodium hydroxide, rice husk and with and without sodium silicate.

In yet another embodiment, the present invention provides a the solid powder of "tailored precursor materials" need "only water" at site, instead of the use of highly alkaline solution for obtaining the tailored cementitious geopolymeric materials.

In an embodiment, the present invention provides the product obtained by the process of the present invention is user and environment friendly, as it obviates the use and need of handling of highly alkaline solutions.

In another embodiment, the present invention provides user-friendly geopolymer cements that can be used under conditions similar to those suitable for portland cement and which are the focus of extensive world-wide research in recent years.

In an embodiment, the present invention provides the production of versatile geopolymer cementitious materials based on "tailored precursor materials" in a solid powder form containing pentavalent silicon complexes as "one part" system obtained by together dry grinding of raw materials fly ash, sodium hydroxide, rice husk and with and without sodium silicate. This one part system can be mixed with water alone to obtain geopolymeric material for broad application spectrum ranging from cement, mortar, on site in-situ concrete to geopolymer coating applications.

The following examples are given by way of illustration of the working of the invention in actual practice and therefore should not be construed to limit the scope of the present invention.

EXAMPLES

Example-1

For making a geopolymeric sample 22.5 gms rice husk, 4.5 Kg of fly ash, 810 gm of solid sodium hydroxide and 405 gms of solid sodium silicate, were dry ground together using a ball mill for a period of 8 hours. The material obtained after grinding was stored in a polyethylene bag for period of seven days. After seven days the ground powder was reacted with 1145 ml water alone. To test the cementitious properties of this geopolymeric material, the standard cube of size 70.6 mm×70.6 mm×70.6 mm, were casted and cured in an air oven at 60° C. for 24 hours duration. There after the samples were removed from the air oven and aged at ambient temperature for 3 and 7 days. The samples so obtained were tested for their compressive strength using Aimil Make hydraulic compressive testing machine. The samples were found to possess compressive strength in the range of 22-24 MPa for samples aged for 3 days and 28-30 MPa. for samples aged for 7 days.

Example-2

For making a geopolymeric sample, 45 gms rice husk, 4.5 Kg of fly ash, 810 gm of solid sodium hydroxide and 2025 gms of solid sodium silicate, were dry ground together using a ball mill for a period of 8 hours. The material obtained after grinding was stored in a polyethylene bag for period of fifteen days. After fifteen days the ground powder was reacted with 1000 ml water alone. To test the cementitious properties of this geopolymeric material, the standard cube of size 70.6 mm×70.6 mm×70.6 mm, were casted and cured in an air oven at 60° C. for 24 hours duration. There after the samples were removed from the air oven and cured using microwave power of 30 watt for a period of 60 minutes. The samples so obtained were tested for their compressive strength using Aimil Make hydraulic compressive testing machine. The samples were found to possess compressive strength in the range of 18-20 MPa.

Example-3

For making a geopolymeric sample 24.75 gms rice husk, 1.65 Kg of fly ash, 300 gm of solid sodium hydroxide and 150 gms of solid sodium silicate, were dry ground together using a ball mill for a period of 12 hours. The material obtained after grinding was stored in a polyethylene bag for period of three days. After three days the ground powder was used for making mortar cubes by taking 4.95 Kg and 600 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 14-17 MPa. for samples cured at 60° C. for 24 h and 20-23 MPa for samples cured at 60° C. for 48 h.

Example-4

For making a geopolymeric sample by taking all the raw materials, 1.65 Kg of fly ash, 300 gm of solid sodium hydroxide, 150 gms of solid sodium silicate and 250 gms rice husk, were dry ground together using a ball mill for a period of 12 hours. The material obtained after grinding was stored in a polyethylene bag for period of three days. After three days the ground powder was used for making mortar cubes by taking 4.95 Kg sand and 600 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 13-15 MPa for samples cured at 60° C. for 24 h and 18-20 MPa for samples cured at 60° C. for 48 h.

Example-5

For making a geopolymeric sample by obviating sodium silicate, 11.55 gms rice husk, 1.65 Kg of fly ash and 300 gm of solid sodium hydroxide, were dry ground together using a ball mill for a period of 12 hours. The material obtained after grinding was stored in a polyethylene bag for period of three days. After three days the ground powder was used for making mortar cubes by taking 4.95 Kg sand and 350 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 42-45 MPa. for samples cured at 60° C. for 24 h and 50-53 MPa for samples cured at 60° C. for 48 h.

Example-6

For making a geopolymeric sample by obviating sodium hydroxide 2.475 gms rice husk, 1.65 Kg of fly ash and 150 gm of solid sodium silicate, were dry ground together using a ball mill for a period of 12 hours. The material obtained after grinding was stored in a polyethylene bag for period of three days. After three days the ground powder was used for making mortar cubes by taking 4.95 Kg sand and 550 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 1-2 MPa for samples cured at 60° C. for 24 h and 2-3 MPa for samples cured at 60° C. for 48 h.

Example-7

For making a geopolymeric sample by obviating sodium silicate, 1.65 Kg of fly ash and 300 gm of solid sodium hydroxide and 250 gms rice husk, were dry ground together using a ball mill for a period of 12 hours. The material obtained after grinding was stored in a polyethylene bag for period of three days. After three days the ground powder was used for making mortar cubes by taking 4.95 Kg sand and 500 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 16-19 MPa for samples cured at 60° C. for 24 h and 20-22 MPa for samples cured at 60° C. for 48 h.

Example-8

For making a geopolymeric sample by obviating sodium silicate, 1.65 Kg of fly ash and 300 gm of solid sodium hydroxide and 250 gms rice husk, were dry ground together using a ball mill for a period of 8 hours. The material obtained after grinding was stored in a polyethylene bag for period of three days. After three days the ground powder was used for making mortar cubes by taking 4.95 Kg sand and 500 ml water alone. To test the cementitious properties of this geopolymeric mortar material, the standard cube of size 70.6 mm×70.6 mm×70.6 mm, were casted and cured in an air oven at 60° C. for 24 hours and 48 hours duration. There after the samples were removed from the air oven and allowed to cool at ambient temperature. The samples so obtained were tested for their compressive strength using Aimil Make hydraulic compressive testing machine. The samples were found to possess compressive strength in the range of 14-16 MPa for samples cured at 60° C. for 24 h and 19-21 MPa for samples cured at 60° C. for 48 h.

Example-9

For making a geopolymeric sample 9 gms rice husk, 4.5 Kg of fly ash, 810 gm of solid sodium hydroxide and 405 gms sodium silicate, were dry ground together using a ball mill for a period of 2 hours. Further, 550 gms of this grinded material was used for making mortar cubes by taking 1.65 Kg sand and 140 ml water alone. To test the cementitious properties of this geopolymeric mortar material, the standard cube of size 70.6 mm×70.6 mm×70.6 mm, were casted and cured in an air oven at 60° C. for 3 days and 7 days. There after the samples were removed from the air oven and allowed to cool at ambient temperature. The samples so obtained were tested for their compressive strength using Aimil Make hydraulic compressive testing machine. The samples were found to possess compressive strength in the range of 22-24 MPa for samples cured at 60° C. for a period of 3 days and 33-36 MPa for samples cured at 60° C. for a period of 7 days.

Example-10

For making a geopolymeric sample 18 gms rice husk, 4.5 Kg of fly ash, 810 gm of solid sodium hydroxide and 405 gms sodium silicate, were dry ground together using a ball mill for a period of 2 hours. Further, 6 Kg of this grinded material was used for making concrete cubes by taking 10 Kg sand, 20 Kg (20 mm down) coarse aggregates and 1220 ml water alone. To test the cementitious properties of this geopolymeric concrete material, the standard cube of size 150 mm×150 mm×150 mm, were casted and cured in an air oven at 60° C. for 3 days, 7 days and 14 days. There after the samples were removed from the air oven and allowed to cool at ambient temperature. The samples so obtained were tested for their compressive strength using Aimil Make hydraulic compressive testing machine. The samples were found to possess compressive strength in the range of 30-32 MPa for samples cured at 60° C. for a period of 3 days, 33-36 MPa for samples cured at 60° C. for a period of 7 days and 36-38 MPa for samples cured at 60° C. for a period of 14 days.

Example-11

For making a geopolymeric sample 27 gms rice husk, 4.5 Kg of fly ash, 810 gm of solid sodium hydroxide and 405 gms sodium silicate, were dry ground together using a ball mill for a period of 24 hours. Further, 6 Kg of this grinded material was used for making concrete cubes by taking 10 Kg sand, 20 Kg (20 mm down) coarse aggregates and 1220 ml water alone. To test the cementitious properties of this geopolymeric concrete material, the standard cube of size 150 mm×150 mm×150 mm, were casted and cured in an air oven at 60° C. for 3 days, 7 days and 14 days. There after the samples were removed from the air oven and allowed to cool at ambient temperature. The samples so obtained were tested for their compressive strength using Aimil Make hydraulic compressive testing machine. The samples were found to possess compressive strength in the range of 20-22 MPa for samples cured at 60° C. for a period of 3 days, 23-25-MPa for samples cured at 60° C. for a period of 7 days and 42-44 MPa for samples cured at 60° C. for a period of 14 days.

Example-12

For making a geopolymeric sample 36 gms rice husk, 4.5 Kg of fly ash, 810 gm of solid sodium hydroxide and 810 gms sodium silicate, were dry ground together using a ball mill for a period of 24 hours. Further, 6 Kg of this grinded material was used for making concrete cubes by taking 10 Kg sand, 20 Kg (20 mm down) coarse aggregates and 1220 ml water alone. To test the cementitious properties of this geopolymeric concrete material, the standard cube of size 150 mm×150 mm×150 mm, were casted and cured in an air oven at 60° C. for 3 days, 7 days and 14 days. There after the samples were removed from the air oven and allowed to cool at ambient temperature. The samples so obtained were tested for their compressive strength using Aimil Make hydraulic compressive testing machine. The samples were found to possess compressive strength in the range of 12-14 MPa for samples cured at 60° C. for a period of 3 days, 28-30 MPa for samples cured at 60° C. for a period of 14 days and 42-44 MPa for samples cured at 60° C. for a period of 28 days.

Example-13

For making a geopolymeric sample 54 gms rice husk, 4.5 Kg of fly ash, 810 gm of solid sodium hydroxide and 2.25 Kg sodium silicate, were dry ground together using a ball mill for a period of 2 hours. Further, 6 Kg of this grinded material was used for making concrete cubes by taking 10 Kg sand, 20 Kg (20 mm down) coarse aggregates and 1220 ml water alone. To test the cementitious properties of this geopolymeric concrete material, the standard cube of size 150 mm×150 mm×150 mm, were casted and cured in an air oven at 60° C. for 3 days and 7 days. There after the samples were removed from the air oven and allowed to cool at ambient temperature. The samples so obtained were tested for their compressive strength using Aimil Make hydraulic compressive testing machine. The samples were found to possess compressive strength in the range of 15-17 MPa for samples cured at 60° C. for a period of 3 days, 20-22 MPa for samples cured at 60° C. for a period of 7 days.

Example-14

For making a geopolymeric sample 63 gms rice husk, 4.5 Kg of fly ash, 810 gm of solid sodium hydroxide and 405 gms sodium silicate, were dry ground together using a ball mill for a period of 2 hours. Further, 550 gms of this grinded material was used for making mortar cubes by taking 1.65 Kg sand and 140 ml water alone. To test the cementitious properties of this geopolymeric mortar material, the standard cube of size 70.6 mm×70.6 mm×70.6 mm, were casted and cured in an air oven at 60° C. for 1 day only. After one day the samples were cured using microwave at 30 watts power for 60 minutes. There after the samples were removed from the microwave oven and allowed to cool at ambient temperature. The samples so obtained were tested for their compressive strength using Aimil Make hydraulic compressive testing machine. The samples were found to possess compressive strength in the range of 44-45 MPa.

Example-15

For making a geopolymeric sample 81 gms rice husk, 4.5 Kg of fly ash, 810 gm of solid sodium hydroxide and 405 gms sodium silicate, were dry ground together using a ball mill for a period of 10 hours. Further, 60 gms of this grinded material was used for making geopolymeric coating material by adding 15 ml water. The coating is applied on mild steel plates by paint brush technique. The plates were heat cured in air oven at 60° C. for 1 hour. The coated plates were tested for temperature resistance using electrical muffle furnace in a temperature range of 100 to 600° C. for a period of 1 hour at each temperature. The coating was found to be stable upto 500° C.

Example-16

For making a geopolymeric sample 4.5 gms rice husk, 4.5 Kg of fly ash, 810 gm of solid sodium hydroxide and 405 gms sodium silicate, were dry ground together using a ball mill for a period of 10 hours. Further, 60 gms of this grinded material was used for making geopolymeric coating material by adding 15 ml water. The coating is applied on mild steel plates by paint brush technique. The plates were heat cured in air oven at 60° C. for 1 hour. The coated plates were tested for corrosion resistance using standard technique of weight loss by immersion of geopolymer coated samples in 3.5% sodium chloride solution for period of upto 120 hours. The coating was found to be stable as proved by negligible weight loss in the sample.

Desirable Features

The developed novel process for making "tailored precursor materials" in a solid powder form containing pentavalent silicon complexes, useful for further broadening the application spectrum of the conventional geopolymeric system is desired for the following reasons:

1. The novel process is user and eco-friendly, whereas the alkali activator solution used in conventional process is highly corrosive and are not user friendly, resulting in difficulty in bulk production of conventional geopolymeric materials and thus limits its commercial viability.

2. The novel process obviates the need of using conventional geothermal silica and solid sodium aluminate as a source of solid silica, alkali and alumina, which are among the rare raw material sources for making geopolymeric materials. The geothermal silica formation takes place by thermal activation of geosilica.

3. The novel process of together mechanical grinding of the raw materials mix in appropriate proportion using conventional as well as by advanced machinery in dry conditions, enables obtaining tailored materials with relatively lesser energy requirements in comparison to use of chemical activation, thermal activation of the raw materials in conventional processes of making geopolymeric materials.

4. It expands application spectrum of geopolymeric materials by tailoring of raw materials and sequencing of reactions among them for appropriate applications ranging from "on site in-situ" application up to pre-engineered materials varying from individual component to advanced coating applications for advancement in the area of geopolymeric system based infrastructure development due to improved resistance to heat and corrosion aspects.

5. The novel process of together grinding of the raw materials mix using conventional as well as by advanced machinery in dry conditions, enables obtaining desired characteristics of pentavalent silicon complexes in the tailored materials with relatively decreased quantities of all the raw materials.

6. The novel process of together grinding of the raw materials mix using conventional as well as by advanced machinery in dry conditions, enables in obviating the need of some of the raw materials and additives completely for some of the application spectrum.

7. The novel process of together grinding of the raw materials mix using conventional as well as by advanced machinery in dry conditions, enables obtaining materials containing size ranging from micron, submicron up to nano sizes, and this characteristics helps in improving physico, chemical, micro structural and mechanical properties of the tailored materials.

8. The novel process of together grinding of the raw materials mix using conventional as well as by advanced machinery in dry conditions, enables obtaining increased amorphicity as well as increased number of mineralogical phases along with increased surface areas of the desired constituents.

9. The novel process of together grinding of the raw materials mix using conventional as well as by advanced machinery in dry conditions, enables obtaining tailored materials containing pentavalent silicon complexes at ambient temperature itself.

10. The novel process of together grinding of the raw materials mix using conventional as well as by advanced machinery in dry conditions, enables obtaining a tailored materials containing pentavalent silicon complexes from the same composition for broad application spectrum, by designing the grinding durations.

11. The novel process of together grinding of the raw materials mix using conventional as well as by advanced machinery in dry conditions, enables in designing the grinding duration i.e intermittent grinding, using desired sequencing of the raw materials for getting solid precursors containing pentavalent silicon complexes.

12. The novel process enables conversion of the physical and chemical state of "ash" from flying state to "un-flying" state without using conventional cement and thus resolves all the issue concerned with the fly ash transportation, storage and bulk utilization aspect and opens up a new spectrum for growth of the thermal power plants and also broadening the application spectrum of flay ash.

13. The -inorganic precursors required for making geopolymeric materials can be obtained from fly ash, sodium hydroxide, rice husk and with and without sodium silicate.

14. The appropriate simultaneous together mechano-chemical processing of raw materials is advantageous as it enables to obtain in-situ, maximum concentration of all the required inorganic-organic moieties from raw materials for obtaining inorganic-organic precursors containing pentavalent silicon complexes for making geopolymeric materials.

15. The present process is advantageous as it is highly energy efficient and economic process for designing of precursors containing pentavalent silicon complexes useful for extending the application spectrum of the conventional geopolymeric materials.

16. The developed novel process is advantageous as it enables to tailor the functionalities by appropriate designing of together grinding and reaction sequencing conditions of the raw materials fly ash, sodium hydroxide, rice husk and sodium silicate. Apart from these, the chemical and thermal treatment using conventional as well as by microwave radiation of precursors materials further helps in tailoring the properties of materials for appropriate application spectrum.

What is claimed is:

1. A tailored precursor material composition in solid form for geopolymer material comprising fly ash (59-91%), sodium hydroxide (11-15%), rice husk (0.8-11%) and optionally sodium silicate (0-29%).

2. The tailored precursor material composition as claimed in claim 1, wherein said composition is incorporated into cement, mortar, on site in-situ concrete, or a geopolymer coating application.

3. The tailored precursor material composition as claimed in claim 1, wherein the composition possesses compressive strength ranging between 2-50 MPa.

4. A process for the preparation of tailored precursor material composition in a solid powder form for geopolymeric material wherein the process comprises:
   i. grinding of raw materials fly ash (59-91%), sodium hydroxide (11-15%), rice husk (0.8-11%) and optionally sodium silicate (0-29%) to get a powder having particle size in the range of 45 to 60 micron to get tailored precursor material;

ii. adding water to the precursor material of step (i) followed by casting the material in a standard mold, and curing the geopolymeric material to obtain a solid powdered form.

5. The process as claimed in claim 4, wherein the raw materials are dry grinded together using ball mill or planetary mill, for a period ranging from 1-72 hours.

6. The process as claimed in claim 4, wherein, the ratio of precursor material and water is 4 to 7.

7. The process as claimed in claim 4, wherein, the curing of geopolymeric material is done using microwave oven for a duration of 10 seconds to 60 minutes with a power range of 5 to 1200 watt.

8. The process as claimed in claim 4, wherein, the curing of geopolymeric material is done using hot air oven at a temperature ranging between 60-90° C. for a period of time 24 hr-7 days.

* * * * *